United States Patent
Graef et al.

(10) Patent No.: US 9,753,877 B2
(45) Date of Patent: Sep. 5, 2017

(54) MEMORY READ-CHANNEL WITH SIGNAL PROCESSING ON GENERAL PURPOSE PROCESSOR

(75) Inventors: Nils Graef, Foster City, CA (US); Erich F. Haratsch, Bethlehem, PA (US)

(73) Assignee: AVAGO TECHNOLOGIES GENERAL IP (SINGAPORE) PTE. LTD., Singapore (SG)

(*) Notice: Subject to any disclaimer, the term of this patent is extended or adjusted under 35 U.S.C. 154(b) by 1149 days.

(21) Appl. No.: 13/510,980

(22) PCT Filed: Nov. 30, 2009

(86) PCT No.: PCT/US2009/066094
§ 371 (c)(1),
(2), (4) Date: May 21, 2012

(87) PCT Pub. No.: WO2011/065958
PCT Pub. Date: Jun. 3, 2011

(65) Prior Publication Data
US 2012/0290894 A1    Nov. 15, 2012

(51) Int. Cl.
G06F 3/00 (2006.01)
G06F 13/38 (2006.01)
G06F 11/10 (2006.01)
G06F 3/06 (2006.01)
G06F 5/10 (2006.01)

(52) U.S. Cl.
CPC ........ *G06F 13/385* (2013.01); *G06F 11/1068* (2013.01); *G06F 3/0619* (2013.01); *G06F 3/0656* (2013.01); *G06F 5/10* (2013.01)

(58) Field of Classification Search
None
See application file for complete search history.

(56) References Cited

U.S. PATENT DOCUMENTS

| 5,014,276 A | 5/1991 | Bush et al. |
| 6,934,317 B1 * | 8/2005 | Dent ............................ 375/140 |
| 7,793,020 B1 | 9/2010 | Howarth et al. |
| 2003/0117924 A1 | 6/2003 | Shiraishi et al. |

(Continued)

FOREIGN PATENT DOCUMENTS

| CN | 1439972 A | 9/2003 |
| CN | 200990242 Y | 12/2007 |

(Continued)

*Primary Examiner* — Aurangzeb Hassan
(74) *Attorney, Agent, or Firm* — Sheridan Ross P.C.

(57) ABSTRACT

Methods and apparatus are provided for processing a data value in a read channel of a memory device. The data value provided to a general purpose processor for processing. The data value is not decoded data and may comprise one or more of a raw data value and an intermediate data value. The data value can be provided to the general purpose processor, for example, upon a detection of one or more predefined trigger conditions. A data value can be obtained from a memory device and then be redirected to a general purpose processor. The data value is not decoded data. The redirection can be conditionally performed if one or more predefined bypass conditions exist. The general purpose processor is optionally time-shared with one or more additional applications.

43 Claims, 6 Drawing Sheets

(56) References Cited

U.S. PATENT DOCUMENTS

| | | |
|---|---|---|
| 2008/0040651 A1* | 2/2008 | Kanaoka et al. ............. 714/794 |
| 2009/0160978 A1* | 6/2009 | Getman et al. ............... 348/241 |
| 2010/0074342 A1* | 3/2010 | Shental et al. ................ 375/259 |

FOREIGN PATENT DOCUMENTS

| | | |
|---|---|---|
| CN | 101114244 A | 1/2008 |
| JP | 8-235790 | 9/1996 |
| JP | 2005135078 | 5/2005 |
| TW | 200731217 | 8/2007 |
| TW | 200723780 | 5/2010 |
| WO | WO 89/06428 | 7/1989 |
| WO | WO 8906428 | 7/1989 |
| WO | WO 2009/067320 | 5/2009 |

\* cited by examiner

MEMORY READ-CHANNEL WITH SIGNAL PROCESSING ON GENERAL PURPOSE PROCESSOR

FIELD OF THE INVENTION

The present invention relates generally to memory devices and more particularly, to improved techniques for data reliability and endurance.

BACKGROUND OF THE INVENTION

Improved data reliability and endurance are important design goals for any storage system. Endurance may be expressed, for example, as a number of read/write cycles or maximum erase counts in solid-state disks, and sector error rates in hard disk drives. Data reliability is often improved by implementing improved signal processing or encoding and decoding algorithms in a read channel, such as an Application Specific Integrated Circuit (ASIC) or Intellectual Property (IP) core within a System-on-Chip (SoC). On a system level, data reliability can be improved by storing files in a redundant manner. For example, a number of storage systems employ a Redundant Array of Independent Disks (RAID). RAID storage systems provide a high level of storage reliability by arranging a plurality of storage devices into arrays for redundancy. Generally, RAID storage schemes divide and replicate data among multiple hard disk drives.

When a storage device becomes damaged or otherwise inaccessible, data recovery techniques can be attempted to salvage data from the storage media. Recovery may be necessary as a result of physical damage to the storage device or logical damage to the file system. Recovery techniques include software-based recovery of corrupted data and hardware replacement on a physically damaged disk. In many cases, data recovery is limited to a one-time recovery of files before the storage media is discarded.

While such redundant storage and data recovery techniques have improved the reliability of storage systems, a number of limitations remain, which if overcome, could further improve the reliability and performance of storage systems. For example, RAID storage systems are generally expensive and consume excessive power. In addition, data recovery techniques typically require the corrupted storage device to be mailed to a data recovery service, which can be expensive and inconvenient.

In a conventional read channel, signal processing is typically performed using dedicated hardware. In order to achieve required data rates and maintain low area and power consumption, a dedicated hardware decoder, for example, typically implements a single decoding algorithm with fixed precision. Thus, in the event of a decoding failure by the dedicated decoding block, there are no alternative decoding options and data will be lost.

A need therefore exists for improved techniques for data reliability and endurance. A further need exists for a memory read channel that allows data to be processed in software on a general purpose processor.

SUMMARY OF THE INVENTION

Generally, a memory read-channel is provided with signal processing on a general purpose processor. According to one aspect of the invention, a data value is processed in a read channel of a memory device. The data value is received and then provided for processing by a general purpose processor. The data value is not decoded data and may comprise one or more of a raw data value and an intermediate data value.

The data value can be provided to the general purpose processor, for example, upon a detection of one or more predefined trigger conditions. The predefined trigger conditions can comprise, for example, detection of a decoding failure, low reliability of detected or decoded data, or a desire to process the data value offline or at a lower data rate.

In one exemplary embodiment, the data value can be selectively provided to the general purpose processor, for example, using a multiplexer. The general purpose processor is provided by a host CPU. The general purpose processor optionally implements one or more of a signal processing algorithm, a decoding algorithm and an error floor mitigation scheme. In one exemplary embodiment, the general purpose processor implements one or more of a Viterbi detection, soft-output Viterbi detection, maximum-a-posteriori (MAP) detection and BCJR (Bahl-Cocke-Jelinek-Raviv) detection functions. The decoding algorithm may comprise an LDPC decoding algorithm, such as a Belief Propagation, Message Passing, Sum-Product or Min-Sum algorithm.

In one variation of the invention, the general purpose processor sequentially implements a plurality of signal processing algorithms. The signal processing algorithms are optionally sequentially implemented until the at least one data value is successfully decoded. The signal processing algorithms can be sequentially implemented with one or more of increased precision and increased complexity.

According to a further aspect of the invention, a data value is obtained from a memory device and is redirected to a general purpose processor. The data value is not decoded data. The redirection can be conditionally performed if one or more predefined bypass conditions exist. The general purpose processor is optionally time-shared with one or more additional applications. The redirection is optionally performed using one or more of a multiplexer and bypass tap inputs.

According to another aspect of the invention, a data value obtained from a memory device is processed using a general purpose processor. The data value processed by the general purpose processor is not decoded data and may comprise one or more of a raw data value and an intermediate data value.

A more complete understanding of the present invention, as well as further features and advantages of the present invention, will be obtained by reference to the following detailed description and drawings.

DETAILED DESCRIPTION

As discussed hereinafter, the present invention provides a memory read channel that allows data to be processed in software on a general purpose processor. According to one aspect of the invention, a memory read-channel is provided with a bypass mode that allows data to be processed in software on a general purpose processor. For example, previously failed data can be processed in software on a general purpose processor using one or more alternative signal processing or decoding algorithms. The present invention applies to any non-volatile memory technology, including hard disk drives (HDD), solid state disks (SSD) and flash drives. The present invention can be employed with any storage mechanism for storing a value in a memory device, such as the use of magnetization, voltages, currents or resistances to represent stored data, as would be apparent to a person of ordinary skill in the art.

Figure 1:
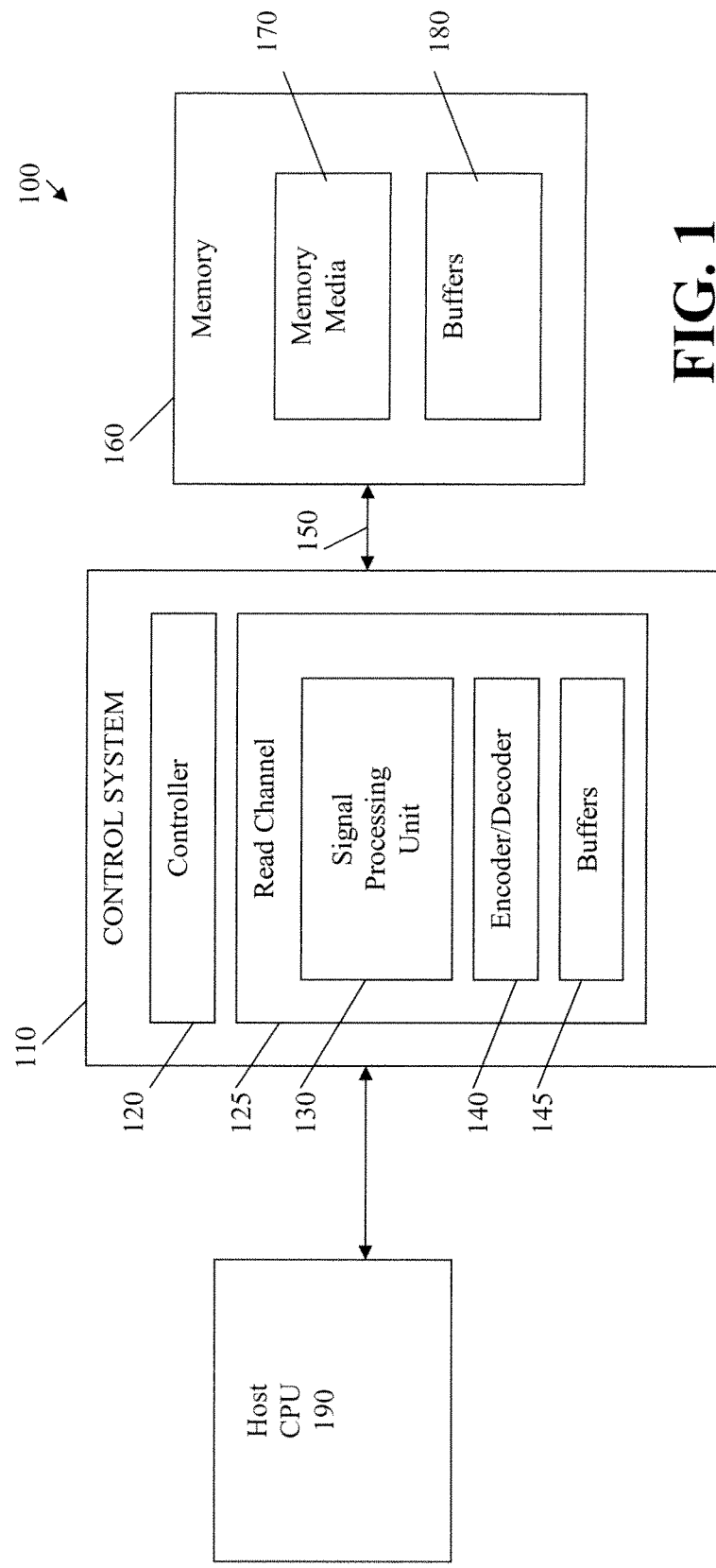
FIG. 1 is a schematic block diagram of a conventional memory system.

FIG. 1 is a schematic block diagram of a conventional memory system 100. As shown in FIG. 1, the exemplary memory system 100 comprises a control system 110 and a memory block 160, connected by an interface 150. The exemplary control system 110 comprises a controller 120 and a read channel 125, typically on one or more integrated circuits.

The exemplary read channel 125 comprises a signal processing unit 130, an encoder/decoder block 140 and one or more buffers 145. It is noted that the term "read channel" can encompass the write channel as well. In an alternative embodiment, the encoder/decoder block 140 and some buffers 145 may be implemented inside the controller 120. The encoder/decoder block 140 and buffers 145 may be implemented, for example, using well-known commercially available techniques and/or products. The exemplary signal processing unit 130 and encoder/decoder 140 typically implement a single algorithm with fixed precision. For a discussion of read channel and signal processing algorithms for hard disk drives, see for example, E. F. Haratsch and Z. A. Keirn, "Digital Signal Processing in Read Channels," Custom Integrated Circuits Conference, 683-90 (September 2005), or A. Kavcic and A. Patapoutian "The Read Channel," Proc. of the IEEE, Vol. 96, Issue 11, 1761-74 (November 2008), each incorporated by reference herein.

For example, in an SSD or flash drive application, the signal processing unit 130 may comprise one or more processors that implement one or more soft demapping or soft data generation processes, or intercell interference cancellation processes. For a more detailed discussion of a suitable read channel 120, signal processing unit 130 and/or controller 120 in an SSD of flash drive application, see, for example, International Patent Application Serial No. PCT/US09/49326, filed Jun. 30, 2009, entitled "Methods and Apparatus for Read-Side Intercell Interference Mitigation in Flash Memories;" or International Patent Application Serial No. PCT/US09/59077, filed Sep. 30, 2009, entitled "Methods and Apparatus for Soft Data Generation for Memory Devices," each incorporated by reference herein.

The exemplary memory block 160 comprises a memory media 170 and one or more buffers 180 that may each be implemented using well-known commercially available techniques and/or products. The memory media 170 may be implemented, for example, as a hard disk drive (HDD), a solid state disk (SSD), a flash drive, or another other non-volatile memory. In a solid state disk implementation, for example, the memory media 170 may be embodied, for example, as a single-level or multi-level cell flash memory, such as a NAND flash memory, a phase-change memory (PCM), an MRAM memory, a NOR flash memory or another non-volatile flash memory. During a read operation, the interface 150 transfers hard and/or soft read values that have been obtained from the memory media 170.

The memory system 100 interacts with a host central processing unit (CPU) 190, such as an Intel Core™ 2 Quad processor or an Intel Pentium™ processor, commercially available from Intel Corporation of Santa Clara, Calif., or another general purpose processor.

In a SSD or flash memory application, the memory media 170 may assign one or more bits to each memory cell, for example, based on a comparison of the measured voltages to the voltage level thresholds (likewise for memory implementations using currents or resistances), which are then transmitted as hard decisions to the read channel 125. In addition or alternatively, in an implementation using soft information, the memory media 110 may transmit the measured voltages or a quantized version of the measured voltages to the read channel 125 as soft information, where a larger number of bits are used to represent the measured voltage than the number of bits stored in the memory cell. The soft information may comprise, for example, probability or reliability information.

Read-Channel Bypass Mode

As previously indicated, in a conventional read channel, such as the read channel 125 of FIG. 1, signal processing is generally performed using dedicated hardware in the signal processing unit 130 and encoder/decoder block 140. In order to achieve required data rates, the signal processing unit 130 and encoder/decoder block 140 typically employ dedicated hardware that implement a single signal processing or decoding algorithm with fixed precision. Thus, in the event of a decoding failure by the dedicated signal processing unit 130 and/or encoder/decoder block 140, there are no alternative signal processing or decoding options, respectively, and data will be lost.

The present invention recognizes that a failure by the dedicated signal processing unit 130 and/or encoder/decoder block 140 may be overcome by processing the failed data using one or more alternative signal processing or decoding techniques. For example, one or more alternative decoding techniques can be performed on the failed data in software executing on an external host CPU or another general purpose processor.

According to one aspect of the present invention, the read channel provides a bypass mode that provides direct access to the raw and/or intermediate data, as those terms are defined herein. For example, a bypass mode in accordance with the present invention can bypass the dedicated signal processing unit 130 and/or encoder/decoder block 140 in the read channel 125 and provide the raw and/or intermediate data, such as hard and/or soft information, directly to the host CPU 190. The host CPU 190 can then implement, for example, one or more alternative signal processing and/or decoding algorithms, such as a decoding algorithm that provides higher precision than the dedicated encoder/decoder block 140 in the read channel 125. In one implementation, the host CPU 190 sequentially implements a plurality of alternative algorithms, discussed further below in a section entitled "Signal Processing Routines." with increasing precision and/or computational complexity, until the previously failed data is successfully decoded, such as a successful decoding of a failed sector or page.

Figure 2:
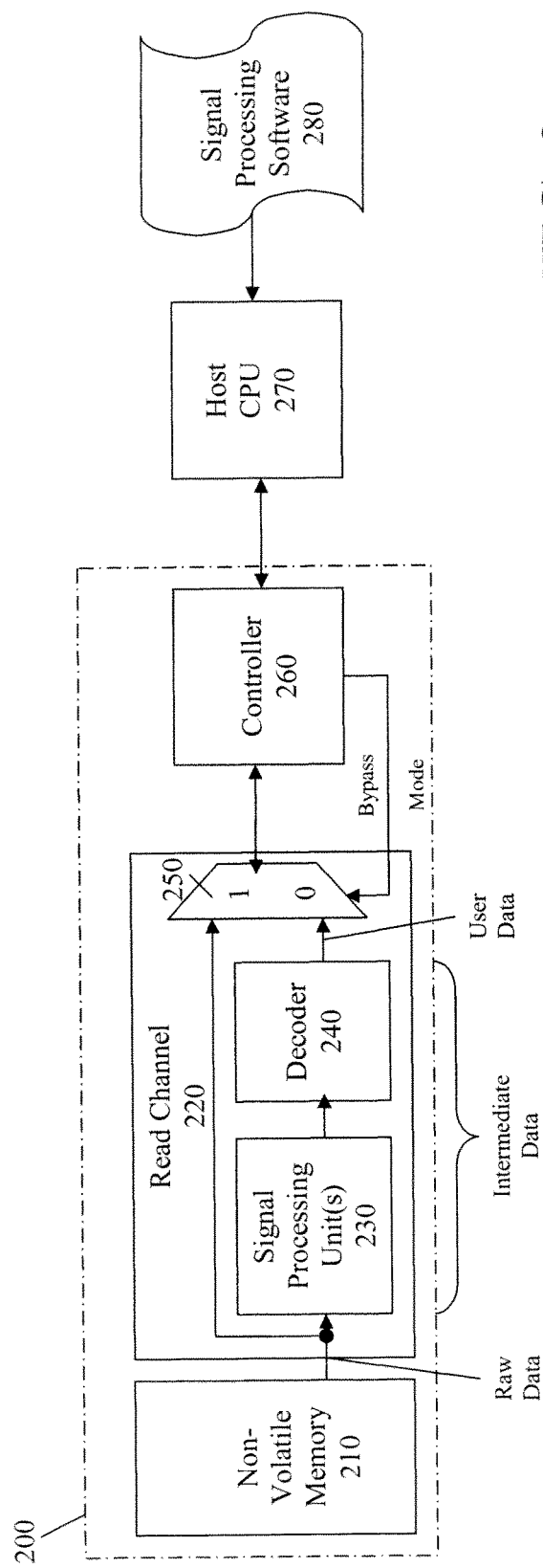
FIG. 2 is a schematic block diagram of a solid state disk (SSD) or flash memory system that incorporates a bypass mode in accordance with one embodiment of the present invention.

FIG. 2 is a schematic block diagram of a solid state disk (SSD) or flash memory system 200 that incorporates a bypass mode in accordance with one embodiment of the present invention. As shown in FIG. 2, the exemplary memory system 200 comprises a non-volatile memory media 210, such as a flash memory, a read channel 220 providing a bypass mode, and a controller 260. Generally, the read channel 220 may be implemented as described in the international patent applications referenced above. The exemplary read channel 220 comprises one or more dedicated signal processing units 230, a dedicated decoder 240 and a multiplexer 250.

The dedicated signal processing unit 230 may comprise, for example, a demapper and/or intercell interference cancellation processes that may be implemented using known techniques, such as the techniques described in International Patent Application Serial No. PCT/US09/49326, filed Jun. 30, 2009, entitled "Methods and Apparatus for Read-Side Intercell Interference Mitigation in Flash Memories;" or International Patent Application Serial No. PCT/US09/49333, filed Jun. 30, 2009, entitled "Methods and Apparatus for Soft Demapping and Intercell Interference Mitigation in Flash Memories," each incorporated by reference herein.

The dedicated decoder 240 may be embodied, for example, using an LDPC decoding algorithm, such as a Belief Propagation, Message Passing, Sum-Product or Min-Sum algorithm. See, for example, A. J. Blanksby and C. J. Howland, "A 690-mW 1-Gb/s 1024-b, Rate-1/2 Low-Density Parity-Check Decoder," IEEE J. Solid-State Circuits, Vol. 37, 404-412 (March 2002); D. E. Hocevar, "LDPC Code Construction With Flexible Hardware Implementation," IEEE Int'l Conf. on Comm. (ICC), Anchorage, Ak., 2708-2712 (May, 2003), or R. N. S. Ratnayake, E. F. Haratsch and Gu-Yeon Wei, "A Bit-Node Centric Architecture for Low-Density Parity Check Decoders," IEEE Global Telecommunications Conference (Globecom), Washington, D.C., 265-270 (November 2007), each incorporated by reference herein.

The memory system 200 can optionally include one or more buffers, such as those shown in FIG. 1, to store raw or intermediate data (or both).

As shown in FIG. 2, and as used herein, the data that is read directly from the memory media, such as the non-volatile memory 210, is referred to herein as "raw data." The data that has been processed by a portion of the read channel 220, prior to decoding by the decoder 240, is referred to herein as "intermediate data." Finally, the decoded data that has been generated by the decoder 240 is referred to herein as "user data." Various aspects of the present invention process the raw and/or intermediate data in software, for example, on a general purpose computer.

The exemplary multiplexer 250 has a first input (labeled "1" in FIG. 2) associated with the bypass mode that receives the raw and/or intermediate data, such as hard and/or soft information, directly from the non-volatile memory media 210 (for example, by initiating a new read operation of the non-volatile memory media 210), or from a buffer (not shown) within the read channel 220. Thus, in a bypass mode, the signal processing unit 230 and decoder 240 are bypassed and the raw and/or intermediate data is provided to the controller 260. The controller 260 then provides the coded data to the host CPU 270. It is noted that such an embodiment that bypasses the entire read channel 220, allows the present invention to be implemented without a modification to the read channel 220.

The exemplary multiplexer 250 has a second input (labeled "0" in FIG. 2) that processes the decoded output (user data) from the dedicated decoder 240. As shown in FIG. 2, the exemplary multiplexer 250 is controlled by a bypass mode selection signal generated by the controller 260. Generally, upon detection of a decoding failure (or another predefined trigger of the bypass mode, such as low reliability of detected or decoded data, or a desire to process the raw or intermediate data offline and/or at a lower data rate), the controller 260 can change the selected multiplexer input from the default second input to the first input. In this manner, the raw and/or intermediate data is provided to the controller 260, which in turn, can provide the raw and/or intermediate data to the host CPU 270.

In an additional or alternative embodiment, the multiplexer 250 can have an input (not shown) that is connected to the output of the signal processing unit 230. In this manner, the controller 260 can optionally obtain the intermediate data for further processing. As discussed below in conjunction with FIG. 4, the intermediate data can be tapped from any digitized part of the read channel 220 within the signal processing block 230 or decoder block 240.

The memory system 200 interacts with the host CPU 270 and the host CPU implements one or more alternative signal processing algorithms 280, or one or more alternative decoding algorithms that use, for example, higher precision than the dedicated exemplary signal processing unit 230 or LDPC decoder block 240 in the read channel 220. Exemplary signal processing algorithms 280 are discussed further below in a section entitled "Signal Processing Routines." As discussed below in conjunction with FIGS. 5 and/or 6, the exemplary signal processing algorithms 280 are implemented in software and executed on a general purpose processor on the host CPU 270.

Figure 3:
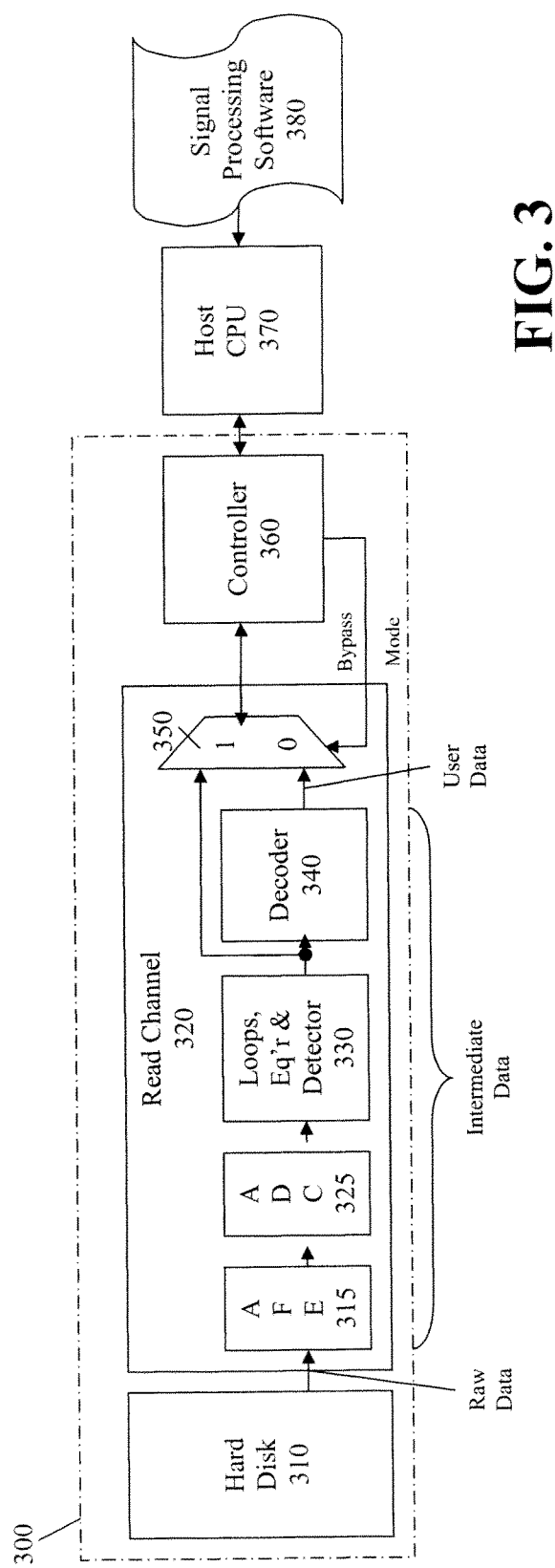
FIG. 3 is a schematic block diagram of a hard disk drive (HDD) memory system that incorporates a bypass mode in accordance with another embodiment of the present invention.

FIG. 3 is a schematic block diagram of a hard disk drive (HDD) memory system 300 that incorporates a bypass mode in accordance with another embodiment of the present invention. As shown in FIG. 3, the exemplary memory system 300 comprises an HDD memory media 310, such as a hard disk, a read channel 320 providing a bypass mode, and a controller 360. Generally, the read channel 320 may be implemented using a conventional hard disk drive read channel, as modified herein to incorporate the features and functions of the present invention. The exemplary read channel 320 comprises an analog front end (AFE) 315, an analog-to-digital converter (ADC) 325, a dedicated loops, equalizer and detector block 330, a dedicated decoder 340 and a multiplexer 350. The AFE block 315 typically includes a variable gain amplifier and continuous time filter (CTF). The ADC 325 converts the analog signals into digital signals for further signal processing and decoding.

The loops in the block 330 perform, for example, timing recovery and adjust the phase of the ADC 325. The equalizer within block 330 (typically implemented as a finite impulse response filter) may provide intersymbol interference mitigation and shape the signal to a target response, all in a known manner. The detector within block 330 may provide further intersymbol interference mitigation and compute hard or soft outputs that are provided to the decoder 340. The detector within block 330 is typically implemented as a Viterbi detector, soft-output Viterbi detector, maximum-a-posteriori (MAP) detector or BCJR (Bahl-Cocke-Jelinek-Raviv) detector. In one implementation, the dedicated decoder 340 may be embodied, for example, using an LDPC decoding algorithm, such as a Belief Propagation, Message Passing, Sum-Product or Min-Sum algorithm. More details on read channels for HDD can be found, for example, in E. F. Haratsch and Z. A. Keirn, "Digital Signal Processing in Read Channels," Custom Integrated Circuits Conference, 683-90 (September 2005), or A. Kavcic and A. Patapoutian "The Read Channel," Proc. of the IEEE, Vol. 96, Issue 11, 1761-74 (November 2008), each incorporated by reference herein.

The exemplary multiplexer 350 has a first input (labeled "1" in FIG. 3) associated with the bypass mode that receives the intermediate data, such as hard and/or soft information, from the output of the loops, equalizer and detector block 330. Thus, in a bypass mode, the decoder 340 is bypassed and the intermediate data is provided to the controller 360. The controller 360 then provides the intermediate data to the host CPU 370.

The exemplary multiplexer 350 has a second input (labeled "0" in FIG. 3) that processes the decoded output (user data) from the dedicated decoder 340. As shown in FIG. 3, the exemplary multiplexer 350 is controlled by a bypass mode selection signal generated by the controller 360. Generally, upon detection of a decoding failure (or another predefined trigger of the bypass mode, such as low reliability of detected or decoded data, or a desire to process the raw and/or intermediate data at a lower data rate), the controller 360 can change the selected multiplexer input from the default second input to the first input. In this manner, the raw and/or intermediate data is provided to the controller 360, which in turn, can provide the raw and/or intermediate data to the host CPU 370.

In an additional or alternative embodiment, discussed below in conjunction with FIG. 4, the multiplexer 350 can have one or more additional inputs (not shown in FIG. 3) connected to any digital point within the read channel 320 (e.g., any digital signal can be tapped after the ADC 325).

The memory system 300 interacts with the host CPU 370 and the host CPU 370 implements one or more signal processing algorithms 380, such as one or more alternative decoding algorithms that provide higher precision than the dedicated exemplary LDPC decoder block 340 in the read channel 320. Exemplary signal processing algorithms 380 are discussed further below in the section entitled "Signal Processing Routines." As discussed below in conjunction with FIGS. 5 and/or 6, the exemplary signal processing algorithms 380 are implemented in software and executed on a general purpose processor on the host CPU 370.

Figure 4:
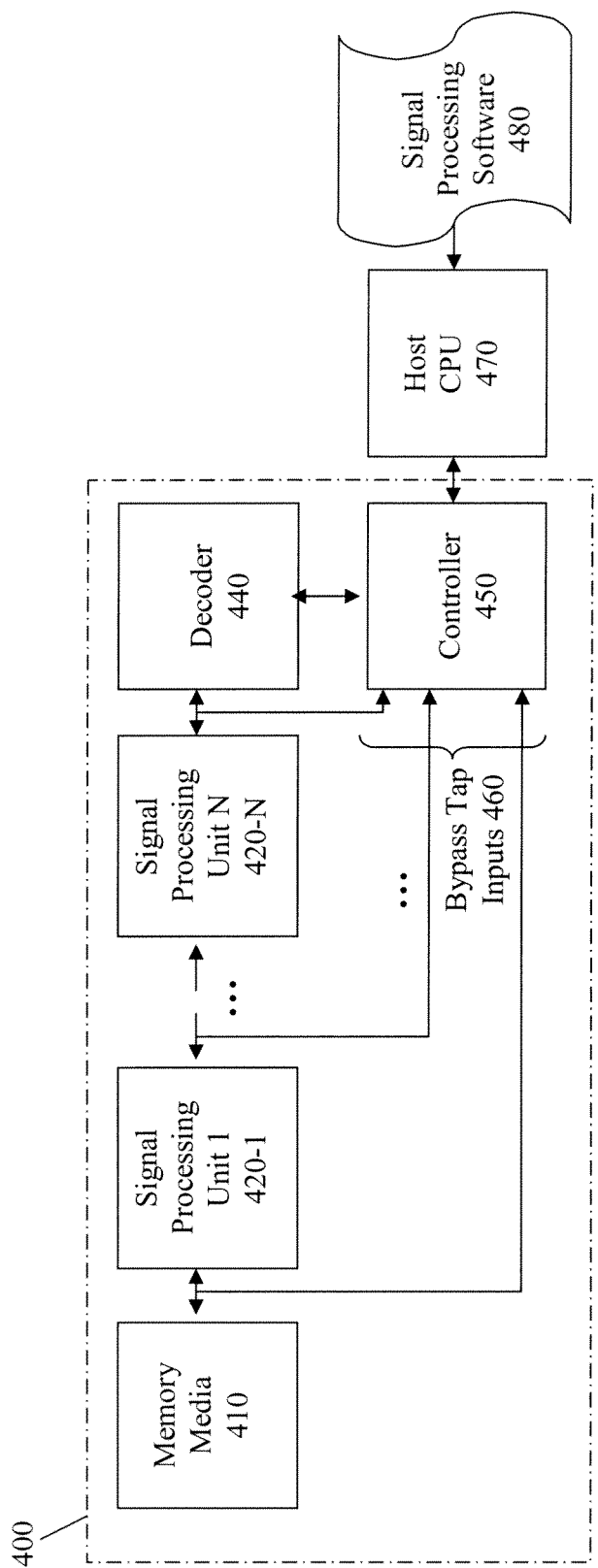
FIG. 4 is a block diagram of an alternative implementation of a read channel that incorporates a bypass mode in accordance with an alternate embodiment of the present invention.

FIG. 4 is a block diagram of an alternative implementation of a read channel 400 that incorporates a bypass mode in accordance with an alternate embodiment of the present invention. The read channel 400 may be for a hard disk drive or a solid state disk. As shown in FIG. 4, the exemplary read channel 400 comprises a memory media 410, such as a flash memory or a hard disk, one or more signal processing units 420-1 through 420-N, a decoder 440 and a controller 450. The signal processing units 420 implement, for example, the signal processing and decoding functions described above in connection with the discussion of the read channel 220 and 320.

As shown in FIG. 4, the controller 450 has one or more bypass tap inputs 460 that allow the controller 450 to selectively tap into the raw and/or intermediate data at a desired location in the read channel 400. The controller 450 then provides the tapped raw and/or intermediate data to the host CPU 470.

Generally, upon detection of a decoding failure (or another predefined trigger of the bypass mode, such as low reliability of detected or decoded data, or a desire to process the raw and/or intermediate data at a lower data rate), the controller 450 can select a desired bypass tap input 460. In this manner, the controller 450 can access the raw and/or intermediate data and, in turn, provide the raw and/or intermediate data to the host CPU 470.

The memory system 400 interacts with the host CPU 470 and the host CPU 470 implements one or more alternative signal processing algorithms 480, discussed further below in the following section entitled "Signal Processing Routines." As discussed below in conjunction with FIGS. 5 and/or 6, the exemplary signal processing algorithms 480 are implemented in software and executed on a general purpose processor on the host CPU 470.

Signal Processing Routines

As previously indicated, in a bypass mode, the host CPU 270, 370 or 470 receives and processes the previously failed raw and/or intermediate data using one or more signal processing or decoding algorithms 280, 380, 480 such as one or more alternative decoding algorithms that employ higher precision and/or computational complexity than the dedicated exemplary LDPC decoder block 240, 340 in the read channel 220, 320. In addition, the signal processing algorithms 280, 380 may comprise one or more "error floor" mitigation schemes. The exemplary alternative signal processing, decoding and error floor mitigation algorithms described herein are intended to illustrate the present invention in a non-limiting manner, and other algorithms could be implemented by the host CPU 270, 370 or 470 without departing from the scope of the present invention, as would be apparent to a person of ordinary skill in the art.

Generally, an "error floor" phenomenon occurs when the error probability of a given code (such as the Bit Error Rate (BER)) does not approach zero as quickly for higher signal-to-noise ratios (SNRs) as it does for lower SNRs. The present invention recognizes that error floor mitigation schemes are typically computationally complex, and thus appropriate for offline processing using the host CPU 270, 370, 470. Also, for the SSD read channel 220 of FIG. 2, the signal processing algorithms 280 may comprise one or more alternative signal processing algorithms that employ higher precision and/or computational complexity than the dedicated signal processing block 230 in the read channel 220. In addition, for the HDD read channel 320 of FIG. 3, the signal processing algorithms 380 may comprise one or more alternative loops, equalization or detection algorithms that employ higher precision and/or computational complexity than the dedicated block 330 in the read channel 320.

As previously indicated, in one exemplary implementation, the host CPU 270, 370, 470 sequentially implements a plurality of alternative signal processing or decoding algorithms 280, 380, 480, with increasing precision and/or computational complexity, until the previously failed data is successfully decoded, such as a successful decoding of a failed sector or page. Also, the host CPU 270, 370, 470 can optionally implement one or more error floor mitigation schemes until successful decoding of a failed sector or page.

Sequential Alternative Signal Processing Algorithms

In one particular exemplary embodiment, the host CPU 270, 370, 470 sequentially implements one or more of the following alternative signal processing algorithms 280, 380, 480 with increasing precision and/or computational complexity, until the previously failed data is successfully decoded (unless otherwise noted, these algorithms are described in further detail in the references cited above):

Viterbi Detection;
Soft-output Viterbi Detection;

BCJR Detection;

Intercell Interference Mitigation Algorithms; and

Soft Demapping Algorithms.

Sequential Alternative Decoding Algorithms

In one particular exemplary embodiment, the host CPU 270, 370, 470 sequentially implements the following alternative decoding algorithms 280, 380, 480 with increasing precision and/or computational complexity, until the previously failed data is successfully decoded (unless otherwise noted, these algorithms are described in further detail in the references cited above):

Sum-Product LDPC Algorithm—using high-resolution floating point precision for all messages and the function $\phi(x)=-\log(\tan h(x/2))$.

Min-Sum LDPC Algorithm—using large word length for all messages.

LDPC Decoding Using Layered Decoder—see, for example, Hocevar, "A Reduced Complexity Decoder Architecture Via Layered Decoding of LDPC Codes," IEEE Workshop on Signal Processing Systems, 107-12 (2004) (see, in particular, equations (9) to (13)), incorporated by reference herein.

Sequential Error Floor Mitigation Schemes

In one particular exemplary embodiment, the host CPU 270, 370, 470 sequentially implements the following error floor mitigation schemes 280, 380, 480 with increasing precision and/or computational complexity, until the previously failed data is successfully decoded (unless otherwise noted, these algorithms are described in further detail in the references cited above)

Averaged Decoding—see, for example, Stefan Laendner et al., "Algorithmic and Combinatorial Analysis of Trapping Sets in Structured LDPC Codes," Wireless Networks, 2005 International Conference on Communications and Mobile Computing, Vol. 1, 630-35 (2005), incorporated by reference herein.

Syndrome Decoding for Common Error Patterns (also referred to as Trapping Sets)—use a precalculated look-up table that, based on the syndrome (i.e., the multiplication of parity check matrix and current hard-decisions of received vector), provides the error bit vector. The decoded code-word can then be calculated by subtracting this error vector from the current hard-decision vector.

Processing of Raw and/or Intermediate Data in Software

One aspect of the present invention recognizes that as general purpose processors become more powerful and more processing cores are implemented in a CPU, signal processing and/or data decoding functions can be implemented in software and executed on the CPU at the required data rates without using a dedicated chip or chip core.

Figure 5:
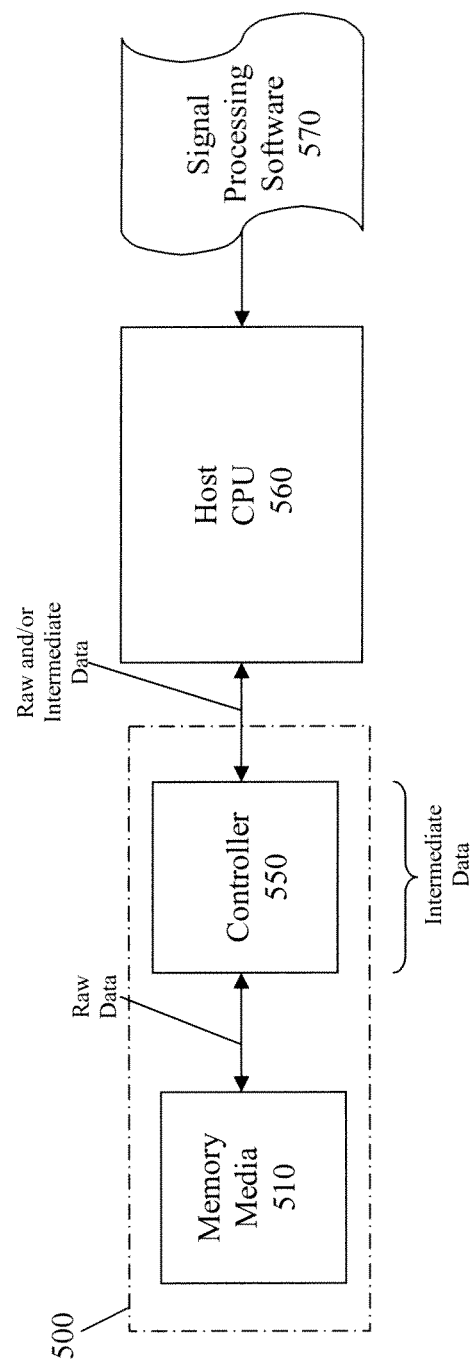
FIG. 5 is a block diagram of an alternative implementation of a memory system that allows read channel algorithms to be processed in software on a general purpose processor.

FIG. 5 is a block diagram of an alternative implementation of a memory system 500 that allows read channel algorithms to be processed in software on a general purpose processor. The memory system 500 may be for a hard disk drive or a solid state disk. As shown in FIG. 5, the exemplary memory system 500 comprises a memory media 510, such as a flash memory or a hard disk, and a controller 550. The controller 550 passes the raw and/or intermediate data to a host CPU 560, such as a general purpose processor.

As shown in FIG. 5, the host CPU 560 receives and processes the raw and/or intermediate data using one or more signal processing algorithms 570, such as one or more signal processing and decoding algorithms and/or one or more "error floor" mitigation schemes, as described above. The host CPU 560 implements the signal processing and decoding functions that are typically implemented in the read channel, such as in the blocks 230, 240, 330, 340. In one exemplary implementation, the host CPU 560 implements also at least a portion of the functions that were typically implemented by the controller 120 (FIG. 1) with conventional designs.

Figure 6:
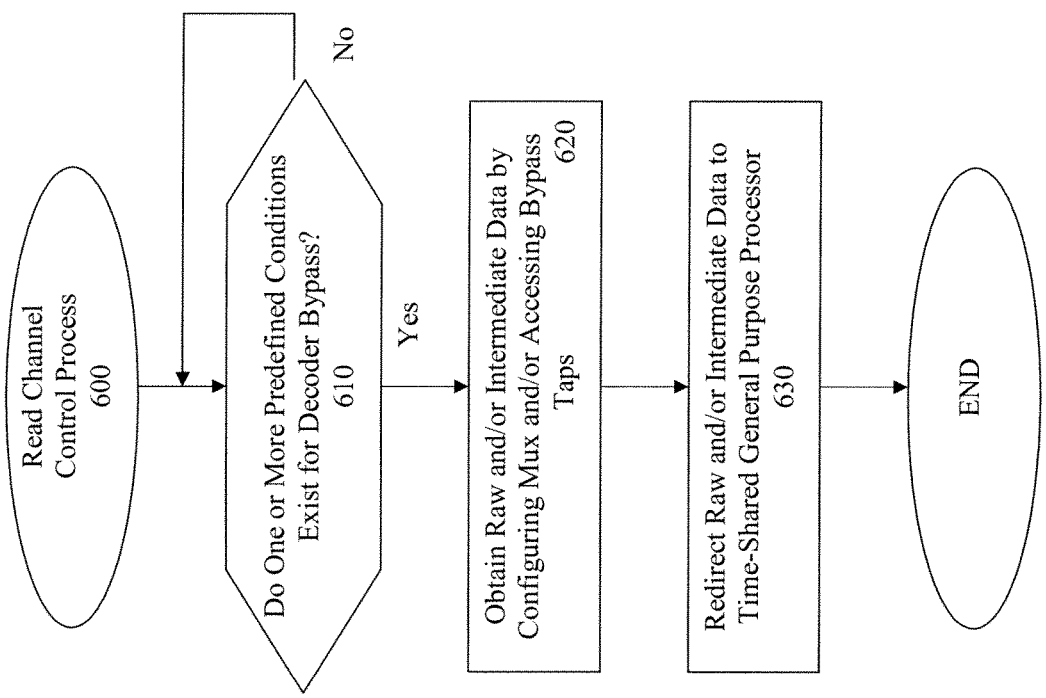
FIG. 6 is a flow chart describing an exemplary implementation of a read channel control process incorporating features of the present invention.

FIG. 6 is a flow chart describing an exemplary implementation of a read channel control process 600 incorporating features of the present invention. The read channel control process 600 may be implemented, for example, by the controller 260, 360, 450, 550 of FIGS. 2-5, respectively. As shown in FIG. 6, the exemplary read channel control process 600 initially performs an optional test during step 610 to determine if one or more predefined conditions exist to trigger a decoder bypass. For example, the predefined conditions may comprise (i) detection of a decoding failure, (ii) low reliability of detected or decoded data (for example the magnitude of the log-likelihood ratios of detected or decoded data are below a threshold) or (iii) a requirement to process the raw or intermediate data offline and/or at a lower data rate.

If it is determined during step 610 that one or more predefined conditions do not exist, then program control returns to step 610 until such a condition exists. If, however, it is determined during step 610 that one or more predefined conditions exist, then the read channel control process 600 obtains the raw and/or intermediate data during step 620 by configuring the multiplexer 250, 350 and/or accessing a desired bypass tap 460.

Finally, during step 630, the read channel control process 600 redirects the raw and/or intermediate data to a general purpose processor 270, 370, 470, 560, such as a general purpose processor that is time-shared with one or more additional applications. In this manner, the processor 270, 370, 470, 560 are time-shared to provide the functions formerly provided by the read channel 125 and controller 120 (FIG. 1) with conventional designs. In this manner, the processor 270, 370, 470, 560 implements the signal processing, decoding or error floor mitigation algorithms that are otherwise implemented using dedicate hardware blocks 230, 240, 330, 340, 420-1 to 420-N.

Process, System and Article of Manufacture Details

While a number of flow charts herein describe an exemplary sequence of steps, it is also an embodiment of the present invention that the sequence may be varied. Various permutations of the algorithm are contemplated as alternate embodiments of the invention. While exemplary embodiments of the present invention have been described with respect to processing steps in a software program, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for processing information in a read channel, said method comprising:
   receiving a data set, wherein the data set includes at least one data value;
   applying a data decode algorithm to the data set by a decoder to yield a decoded output; and
   selecting between the at least one data value and at least one element of the decoded output to be provided for processing by a general purpose processor.

2. The method of claim 1, wherein said selecting is based at least in part upon a detection of one or more predefined trigger conditions.

3. The method of claim 2, wherein said one or more predefined trigger conditions comprise detection of a decoding failure.

4. The method of claim 2, wherein said one or more predefined trigger conditions comprise one or more of a detection of a decoding failure, low reliability of detected or decoded data, a desire to process said data value offline and a desire to process said data value at a lower data rate.

5. The method of claim 1, wherein the method further comprises:
   accessing a storage medium, wherein the data set is derived from accessing the storage medium.

6. The method of claim 1, wherein said selecting is performed by a multiplexer.

7. The method of claim 1, wherein said at least one data value comprises one or more of hard information and soft information.

8. The method of claim 1, wherein said at least one data value comprises one or more of a raw data value and an intermediate data value.

9. The method of claim 8, further comprising storing one or more of said raw and intermediate data values in a buffer prior to selecting between the at least one data value and at least one element of the decoded output.

10. The method of claim 1, wherein said general purpose processor implements one or more of a signal processing algorithm, decoding algorithm and an error floor mitigation scheme.

11. The method of claim 10, wherein said data decode algorithm is an LDPC decoding algorithm.

12. The method of claim 11, wherein said LDPC decoding algorithm comprises one or more of a Belief Propagation, Message Passing, Sum-Product and Min-Sum algorithm.

13. The method of claim 1, wherein said general purpose processor implements one or more of a Viterbi detection, soft-output Viterbi detection, maximum-a-posteriori (MAP) detection and BCJR (Bahl-Cocke-Jelinek-Raviv) detection functions.

14. The method of claim 1, wherein said general purpose processor implements one or more of an intercell interference mitigation algorithm and a soft demapping algorithm.

15. The method of claim 1, wherein said general purpose processor is provided by a host CPU.

16. The method of claim 1, wherein said general purpose processor sequentially implements a plurality of signal processing algorithms.

17. The method of claim 16, wherein said signal processing algorithms are sequentially implemented until said at least one data value is successfully decoded.

18. The method of claim 16, wherein said signal processing algorithms are sequentially implemented with one or more of increased precision and increased complexity.

19. A method for processing at least one data value obtained from a memory device, said method comprising:
   receiving said at least one data value, wherein the at least one data value is included in a data set;
   applying a data decode algorithm to the data set by a decoder to yield a decoded output; and
   redirecting said at least one data value to a general purpose processor in place of a corresponding element of the decoded output, wherein said at least one data value is not decoded data.

20. The method of claim 19, further comprising conditionally performing said redirecting step if one or more predefined bypass conditions exist.

21. The method of claim 20, wherein the predefined conditions comprise one or more of detection of a decoding failure, low reliability of detected or decoded data, a requirement to process the at least one data value offline and a requirement to process the at least one data value at a lower data rate.

22. The method of claim 20, wherein said general purpose processor is time-shared with one or more additional applications.

23. The method of claim 20, wherein said redirecting is performed using one or more of a multiplexer and bypass tap inputs.

24. A system for processing information, comprising:
a storage device; and
at least one processor, coupled to the memory, operative to:
receive a data set;
applying a data decode algorithm to the data set by a decoder to yield a decoded output; and
selecting between at least one element of the data set and at least one element of the decoded output to be provided for processing by a general purpose processor.

25. A method for processing at least one data value accessed from a storage medium as part of a data set, said method comprising:
receiving said at least one data value;
applying a data decode algorithm to the data set by a decoder to yield a decoded output;
detecting one or more predefined trigger conditions; and
based at least in part upon detecting the one or more predefined trigger conditions, processing said at least one data value using a general purpose processor.

26. The method of claim 25, wherein the method further comprises:
accessing the storage medium.

27. The method of claim 25, wherein said at least one data value comprises one or more of a raw data value and an intermediate data value.

28. The method of claim 27, further comprising:
storing one or more of said raw and intermediate data values in a buffer prior to said processing step.

29. The method of claim 25, wherein said storage medium is a flash memory device.

30. The method of claim 25, wherein said general purpose processor is provided by a host CPU.

31. The method of claim 25, wherein said one or more predefined trigger conditions comprise detection of a decoding failure.

32. The method of claim 25, wherein said one or more predefined trigger conditions comprise one or more of a detection of a decoding failure, low reliability of detected or decoded data, a desire to process said data value offline and a desire to process said data value at a lower data rate.

33. The method of claim 25, wherein said processing includes selectively providing said at least one data value for processing by said general purpose processor.

34. The method of claim 33, wherein said selectively providing said at least one data value is performed by a multiplexer.

35. The method of claim 25, wherein said at least one data value comprises one or more of hard information and soft information.

36. The method of claim 25, wherein said general purpose processor implements one or more of a signal processing algorithm, decoding algorithm and an error floor mitigation scheme.

37. The method of claim 36, wherein said data decode algorithm is an LDPC decoding algorithm.

38. The method of claim 37, wherein said LDPC decoding algorithm comprises one or more of a Belief Propagation, Message Passing, Sum-Product and Min-Sum algorithm.

39. The method of claim 25, wherein said general purpose processor implements one or more of a Viterbi detection, soft-output Viterbi detection, maximum-a-posteriori (MAP) detection and BCJR (Bahl-Cocke-Jelinek-Raviv) detection functions.

40. The method of claim 25, wherein said general purpose processor sequentially implements a plurality of signal processing algorithms.

41. The method of claim 40, wherein said signal processing algorithms are sequentially implemented until said at least one data value is successfully decoded.

42. The method of claim 40, wherein said signal processing algorithms are sequentially implemented with one or more of increased precision and increased complexity.

43. The method of claim 25, wherein said general purpose processor implements one or more of an intercell interference mitigation algorithm and a soft demapping algorithm.

* * * * *